(12) United States Patent
Fitzpatrick et al.

(10) Patent No.: US 7,493,359 B2
(45) Date of Patent: Feb. 17, 2009

(54) E-MAIL ROLE TEMPLATES FOR CLASSIFYING E-MAIL

(75) Inventors: Gregory P. Fitzpatrick, Keller, TX (US); Carl Phillip Gusler, Austin, TX (US); Rick Allen Hamilton, II, Charlottesville, VA (US); David B. Lebowitz, North Richland Hills, TX (US)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 11/016,128

(22) Filed: Dec. 17, 2004

(65) Prior Publication Data

US 2006/0168029 A1    Jul. 27, 2006

(51) Int. Cl.
*G06F 15/16* (2006.01)
*G06F 15/173* (2006.01)

(52) U.S. Cl. .................. 709/202; 709/205; 709/238
(58) Field of Classification Search .............. 709/202, 709/205, 238
See application file for complete search history.

(56) References Cited

U.S. PATENT DOCUMENTS

| | | | |
|---|---|---|---|
| 5,557,723 A | 9/1996 | Holt et al. | |
| 5,917,489 A | 6/1999 | Thurlow et al. | |
| 6,707,472 B1 | 3/2004 | Grauman | |
| 6,721,402 B2 | 4/2004 | Usami | |
| 6,721,785 B1 | 4/2004 | Raghunandan | |
| 6,725,228 B1 | 4/2004 | Clark et al. | |
| 6,725,269 B1 | 4/2004 | Megiddo | |
| 2002/0087646 A1 | 7/2002 | Hickey et al. | |
| 2002/0120701 A1 | 8/2002 | Ohba | |
| 2002/0169841 A1 | 11/2002 | Carlson et al. | |
| 2003/0069887 A1 | 4/2003 | Lucovsky et al. | |
| 2003/0120737 A1 | 6/2003 | Lytle et al. | |
| 2003/0158903 A1 | 8/2003 | Rohall et al. | |
| 2003/0167234 A1 | 9/2003 | Bodmer et al. | |
| 2004/0068547 A1 | 4/2004 | Kang | |
| 2004/0073614 A1 | 4/2004 | Blohm | |
| 2004/0073616 A1 | 4/2004 | Fellenstein et al. | |
| 2006/0053279 A1* | 3/2006 | Coueignoux ................ | 713/154 |

FOREIGN PATENT DOCUMENTS

| | | |
|---|---|---|
| WO | WO 0120847 | 3/2001 |
| WO | WO 2004030296 | 4/2004 |

\* cited by examiner

*Primary Examiner*—Paul H Kang
(74) *Attorney, Agent, or Firm*—Akerman Senterfitt

(57) ABSTRACT

An e-mail categorization system can include a plurality of role templates, each role template being associated with an e-mail account and defining a plurality of categories for categorizing e-mail messages. An authorized account holder can establish the plurality of categories and can designate programmatic actions that are to be selectively executed by an e-mail receiving application upon the receipt of e-mail messages. The selection of actions can be based upon categories of the received e-mail messages. Role templates can be distributed to e-mail originators so that when e-mail originators direct e-mail messages to an account associated with a role template, the originators are prompted to select one of the categories defined by a corresponding role template.

3 Claims, 3 Drawing Sheets

E-MAIL ROLE TEMPLATES FOR CLASSIFYING E-MAIL

BACKGROUND

1. Field of the Invention

The present invention relates to e-mail and, more particularly, to an innovation to categorize e-mail 2. Description of the Related Art Electronic mail (e-mail) has proven to be an efficient and effective communication mechanism for both personal and business purposes. Use of e-mail has become so wide-spread that e-mail communicators can become inundated with messages. To handle message volume, message recipients typically group incoming e-mail into categories. Different categories can have different priorities in the mind of the recipient, which can vary over time.

For example, if a manager of projects establishes multiple project-specific categories, the importance of received e-mail can be directly proportional to project deadlines and other project-specific factors, which can shift over time. That is, once a specific project's deadlines have been met, its relative priority can shift downwards in relationship to another project having more urgent deadlines.

Categories, however, are not just limited to business projects, but can instead represent any definable facet of a recipient's life. A recipient can, for example, categorize messages to distinguish personal messages from business messages. Personal messages can be categorized differently for family, friends, relationships, hobbies, amusement, and so forth. Categorization of e-mail can be performed implicitly or explicitly.

Implicit categorization can involve a recipient glancing at incoming e-mail messages and reading or responding to these messages based upon subject line, date, and sender. Practical concerns like message volume, e-mail storage space restrictions, and temporal priority shifts can cause implicit categorization techniques to fail or to at least cause problems. The situation is analogous to a professional who retains all phone numbers, appointments, tasks, and notes in a disorganized or at least not an explicitly organized fashion—over time important matters are overlooked, which is why contact management software and contact management systems are commonly used by executives, staff, sales people, students, and the like.

When e-mail is explicitly categorized for a single e-mail account, different folders or cabinets, each representing a category, can be used to store e-mail correspondence. Automated tools provided by an e-mail application, such as a message sorting tool, a message search tool, an archiving tool, user defined automated rules and actions, and the like can be used in conjunction with these folders and cabinets to provide some help with message management.

Despite these tools, separating out e-mail messages into the established folders can be tedious and time consuming. Further, when many folders exist having overlapping content coverage, users can forget which folders or subfolders were used to organize a desired message. Accordingly, the same problems experienced with managing documents through a hierarchical file management application can be experienced by users attempting to use folders to organize e-mail.

Another means to explicitly categorize e-mail is to utilize multiple e-mail accounts, such as a business account and a personal account. Nothing, however, prevents senders from using a familiar (albeit outdated or incorrect) e-mail account for correspondence. For example, a family member or friend can use a known business e-mail account to send personal messages. Commonly, since it is easy to send a single message to multiple e-mail accounts, senders of e-mail will include all known e-mail addresses for an individual when sending that individual messages, which circumvents the recipients intent to categorize e-mail by e-mail account. Further, maintaining, utilizing, and checking multiple e-mail accounts can be burdensome to manage.

An innovation is needed that enables e-mail users to define categories, which are to be subsequently used to manage e-mail correspondence such that the innovation is flexible enough to shift as user defined categories and roles shift, yet which is simple and intuitive for e-mail communicators to utilize.

SUMMARY OF THE INVENTION

The present invention provides a system, method, and apparatus for categorizing e-mail in accordance to the inventive arrangements detailed herein. More specifically, the invention utilizes user-configurable role templates. Each role template can be associated with a particular e-mail account. The user of the account or account holder can define the specifics of the role template. The role template can be provided to parties wishing to correspond to the user via e-mail, resulting in an option being presented to these parties to designate one of the template-defined categories whenever e-mail is directed to the user. Accordingly, when the user receives an e-mail message, that message can be automatically categorized in accordance with the category designated by the e-mail originator. In one embodiment, the present invention can include a mechanism designed to handle outdated or stale templates.

One aspect of the present invention can include an e-mail categorization system. The system can include a plurality of role templates, each role template being associated with an e-mail account and defining a plurality of categories for grouping e-mail messages. An authorized account holder can establish the plurality of categories and can designate programmatic actions that are to be selectively executed by an e-mail receiving application upon the receipt of e-mail messages. The selection of actions can be based upon categories of the received e-mail messages. Role templates can be distributed to e-mail originators so that when e-mail originators direct e-mail messages to an account associated with a role template, the originators are prompted to select one of the categories defined by a corresponding role template.

Another aspect of the present invention can include a computerized e-mailing method comprising the steps of identifying a role template for an e-mail account and prompting an e-mail originator to designate a category based upon the role template when directing an e-mail message to the e-mail account. The designated category can be conveyed to the e-mail account along with the e-mail message. For example, the category can be designated with metadata of the e-mail message. Different e-mail accounts can have different associated role-templates and thus have different assigned categories, which the e-mail originator is prompted to select from when creating e-mail messages.

Still another aspect of the present invention can include a computerized e-mailing method where an e-mail account holder can provide input that defines a plurality of categories for an e-mail account. A role template can be established in accordance with the received input. The established role template can be distributed to e-mail communicators. Indicators can be received from e-mail communicators when the communicators send mail to the e-mail account. The indicators can designate one of the categories defined by the role template that is to be applied to the e-mail. The indicators can be used to handle the received e-mail messages in a manner defined by e-mail handling rules.

It should be noted that the invention can be implemented as a program for a controlling computer to implement the functions described herein, or as a program for enabling a computer to perform the process corresponding to the steps disclosed herein. This program may be provided by storing the program in a magnetic disk, an optical disk, a semiconductor memory, any other recording medium, or distributed via a network.

BRIEF DESCRIPTION OF THE DRAWINGS

There are shown in the drawings, embodiments which are presently preferred, it being understood, however, that the invention is not limited to the precise arrangements and instrumentalities shown herein.

DETAILED DESCRIPTION OF THE INVENTION

Figure 1:
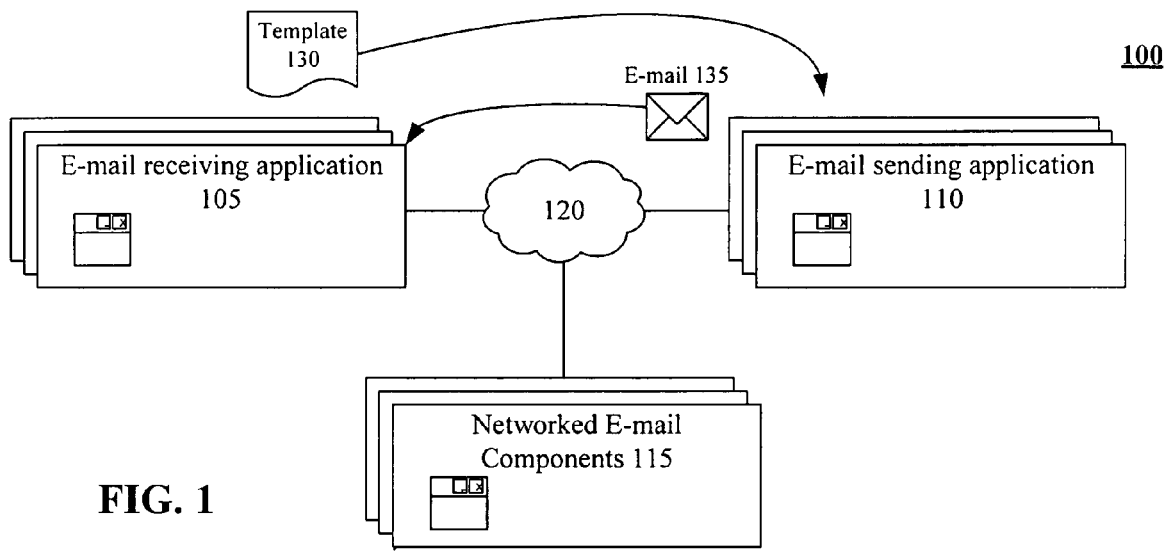
FIG. 1 is a schematic diagram illustrating a system that utilizes role templates to manage e-mail in accordance to an embodiment of the inventive arrangements disclosed herein.

FIG. 1 is a schematic diagram illustrating a system 100 that utilizes role templates to manage e-mail in accordance to an embodiment of the inventive arrangements disclosed herein. System 100 can include at least one e-mail receiving application 105, at least one e-mail sending application 110, and any number of networked e-mail components 115. The e-mail receiving application 105 and e-mail sending application 110 can both represent an e-mail client application that an e-mail account holder utilizes to send, receive, view, compose, organize, and otherwise manipulate e-mail messages. The networked e-mail components 115 can include e-mail server components, remotely located enhancements that add capabilities to application 105 and/or 110, and other components used to facilitate e-mail communications or template management.

In system 100, the e-mail receiving application 105 can establish and/or be associated with a role template 130, that specifies roles or categories that received e-mail is to be classified into. The role template 130 can be disseminated so that it is accessible by e-mail sending application 110. When e-mail sending application 110 generates e-mail message 135 addressed to the e-mail receiving application 105, the e-mail sending application 110 can designate one of the roles or categories defined by the role template 130 that applies to the e-mail message 135. The e-mail receiving application 105 utilizes the designated category or role when handling the e-mail message 135.

In one embodiment, role template 130 can be written in any of a variety of formats, such as a plain text format, a binary format, an encrypted format, and the like. Role template 130 can include an assortment of data useful when implementing system 100. For example, template 130 can specify one or more roles and/or categories established for an associated e-mail receiving application. Role template 130 can also specify role and/or category specific programmatic actions and action triggering conditions that are to be executed when processing e-mail. Further, role template 130 can contain information about the e-mail receiving application 105 as well as information about an associated e-mail account or e-mail account holder. Additionally, role template 130 can optionally include a digital signature, passcode, encryption key, and the like that can be used for authentication or security purposes.

The e-mail message 135, can include role template requested information, such as a category designator or a role designator. The included information can be included within e-mail message 135 or can be conveyed in parallel with the e-mail message 135.

For example, the information can be included within metadata of the e-mail message 135 or can be included within an attachment of the e-mail message 135. In another example, the requested information can be included in a separate e-mail message or other communication that is separately conveyed to the e-mail receiving application 105 at approximately the same time as the e-mail message 135 is conveyed.

Figure 2:
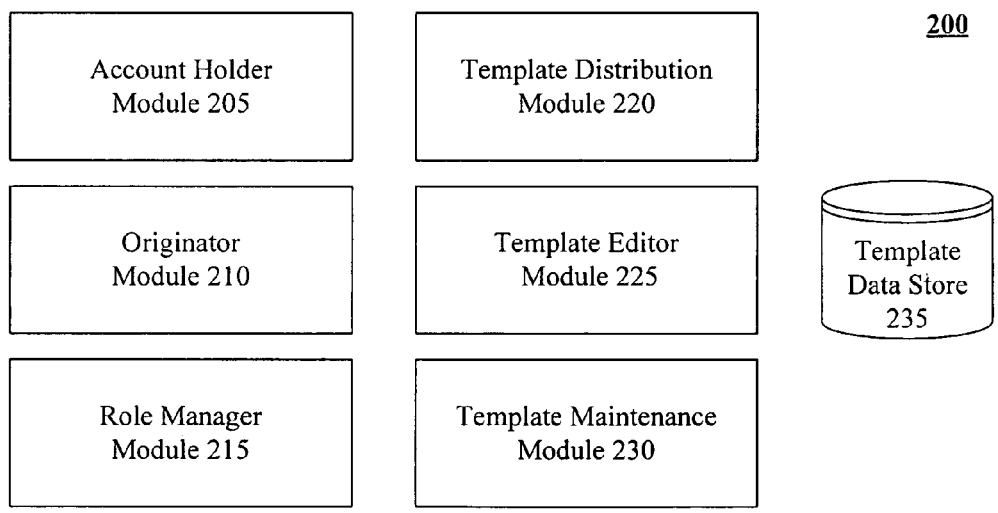
FIG. 2 is a system diagram of a system of modules used for implementing role templates in accordance with an embodiment of the illustrative arrangements disclosed herein.

FIG. 2 is a schematic diagram illustrating a system 200 of modules for implementing role templates in accordance with the inventive arrangements disclosed herein. Specifically, system 200 includes an account holder modular 205, an originator module 210, a role manager module 215, a template distribution module 220, a template editor module 225, and a template maintenance module 230. System 200 also includes a template data store 235 that each of the modules 205-230 can use to store, retrieve, and otherwise access role template information.

Each of the modules 205-230 can be distributed throughout a communicatively linked e-mail communication system in a variety of ways, which result in the overall functionality described herein. Modules 205-230 can have overlapping functionality or can uniquely provide the functionality described for that module. The present invention contemplates that each of the modules 205-230 can be implemented within an e-mail client, an e-mail server, or a network application. Further, each of the modules 205-230 can be implemented in an e-mail account specific manner, an e-mail server specific manner, or implemented generally for an e-mail communication system.

To illustrate, in one embodiment, each of the modules 205-230 can be implemented within software specific to each e-mail communicator. For example, when modules 205-230 are implemented within system 100, the e-mail receiving application 105 and the e-mail sending application 110 can each include modules 205-230 as well as a localized version of template data store 235. In another embodiment, only a portion of modules 205-230 can be implemented within software specific to each e-mail communicator. For example, modules 205-230 and data store 235 can be implemented in system 100 as networked e-mail components 115 that are accessed by e-mail receiving application 105 and e-mail sending application 110 as needed. In still another example in which the modules of system 200 are utilized by system 100, the account holder module 205 and the template editor module 225 can be modules local to e-mail receiving application 105, the originator module 210 and template data store 235 can reside in a computer space local to e-mail sending application 110, and the role manager module 215, template distribution module 220, and template maintenance module 230 can be networked e-mail components 115.

The account holder module 205 can include machine-readable code that directs a computing device to handle an account holder's e-mail account in accordance with a particular role template. The account holder module 205 can interface with an account-holders e-mail account, adding role template enhancements to the account. The account holder module 205 can permit the account holder to receive e-mail messages, detect a sender designated category associated with received e-mail messages, and to process the received messages according to the designated category.

The account holder module 205 can also implement any security measures or privacy measures established by the role template. For example, the account holder module 205 can alleviate problems with unsolicited e-mail (SPAM) by restricting role template access to a privileged group and by rejecting any incoming e-mail messages that do not properly designate a valid category or role. In a related but more security intense example, an e-mail communicator accessing a role template can surreptitiously be conveyed an encryption key, passcode, or digital certificate that is automatically included within e-mail sent to the associated e-mail account. In such an example, the account holder module 205 can include programmatic code to detect the security key, to validate the key, and to reject non-authorized messages.

The originator module 210 can include machine-readable code that directs a computing device to generate e-mail messages in conformance with one or more role templates. The originator module 210 can be integrated with an e-mail originators e-mailing software. The originator module 210 can detect an e-mail originating event, and can responsively determine which, if any, e-mail recipients have an associated role template. For each recipient having an associated template, the originator module 210 can require that a category or role defined by the template be specified. The specification of a category or role can occur in many ways including, prompting a user via a selection box, prompting a user to confirm a default response, automatically filling in a category or role based upon historical interactions or originator established defaults, and the like. The originator module 210 can also include code necessary to receive template updates and responsively adjust suitable parameters in accordance with the updates.

The role manager module 215 can include machine-readable code that establishes and enforces role related rules and ensures that role and category currency is maintained across an e-mail correspondence space. For instance, an account holder, e-mail account administrator, or software agent can decide that a role is no longer appropriate due to a job change, interest change, or other factor. As a result, the outdated role can be marked as being a stale role. The role manager module 215 can broadcast that a role has become stale and can propose actions that are to be taken by broadcast recipients.

One such action can indicate that e-mail originators are to delete or deactivate a stale role so that new e-mail messages cannot be associated with a stale role. Another such action can cause a stale role to be replaced with an active role still defined within the role template. Still another action can cause an account holder to automatically convey a message to an e-mail originator, whenever the originator categorizes an e-mail message using a stale role. In one embodiment, the role manager module 215 can establish a "grace period" along with a notification so that e-mails classified using a stale role are still accepted by an account holder until the grace period expires.

The template distribution module 220 can include machine-readable code that directs a computing device to disseminate one or more role templates or updates to role templates. In one embodiment, the template distribution module 220 can exchange templates with a plurality of e-mail communicators via one or more e-mail messages. Receivers that are directly conveyed templates via the template distribution module 220 can require that the template distribution module 220 is certified or trusted before templates are accepted. In another embodiment, the template distribution module 220 can convey template information to the template data store 235. The template distribution module 220 may additionally convey a notice to one or more e-mail communicators to inform them that the template information can be acquired through the template data store 235. Each individual role template can define template-specific distribution parameters, which the template distribution module 220 can follow.

The template editor module 225 can include machine readable code for establishing and editing role templates. In one embodiment, the template editor module 225 can provide an interface through which account holders and/or other authorized individuals can manipulate role templates. The interface can, for example, be a graphical user interface (GUI) that includes drop-down selection elements, checkboxes for available options, and other GUI elements. The interface provided by the template editor module 225 is not limited in this regard, however, and can be any of a variety of interface including, but not limited to, a voice response interface, a Web-based interface, a multimodal interface, and the like.

In another embodiment, the template editor module 225 can be communicatively linked to a management information system (MIS). In such an embodiment, account holder projects and roles can be automatically extracted from the MIS and used to automatically populate template and roles that correspond to the extracted information.

The template maintenance module 230 can include machine-readable code that actively polices and/or manages an e-mail correspondence space enabled for role templates. For example, the template maintenance module 230 can trigger e-mail communicators to iteratively update local data stores containing role template information. The template maintenance module 230 can also automatically update previously disseminated role templates from a dated version to a more current one. In one embodiment, the template maintenance module 230 can revoke previously granted privileges to an e-mail originator, thereby deleting or modifying role template information used by the e-mail originator. The template maintenance module 230 can also grant new e-mailing privileges to designated e-mail accounts.

The data store 235 can store information in any recording medium, such as a magnetic disk, an optical disk, a semiconductor memory, or the like. Further, data store 235 can utilize any information retention technique including a file-based storage technique or a database storage technique. Moreover, data store 235 can be a storage area fixed to a geographical location or a storage area distributed across a network space. Additionally, data store 235 can represent a persistent memory region, such as hard drive memory space, as well as a volatile memory region, such as a random access memory (RAM) memory space.

Figure 3:
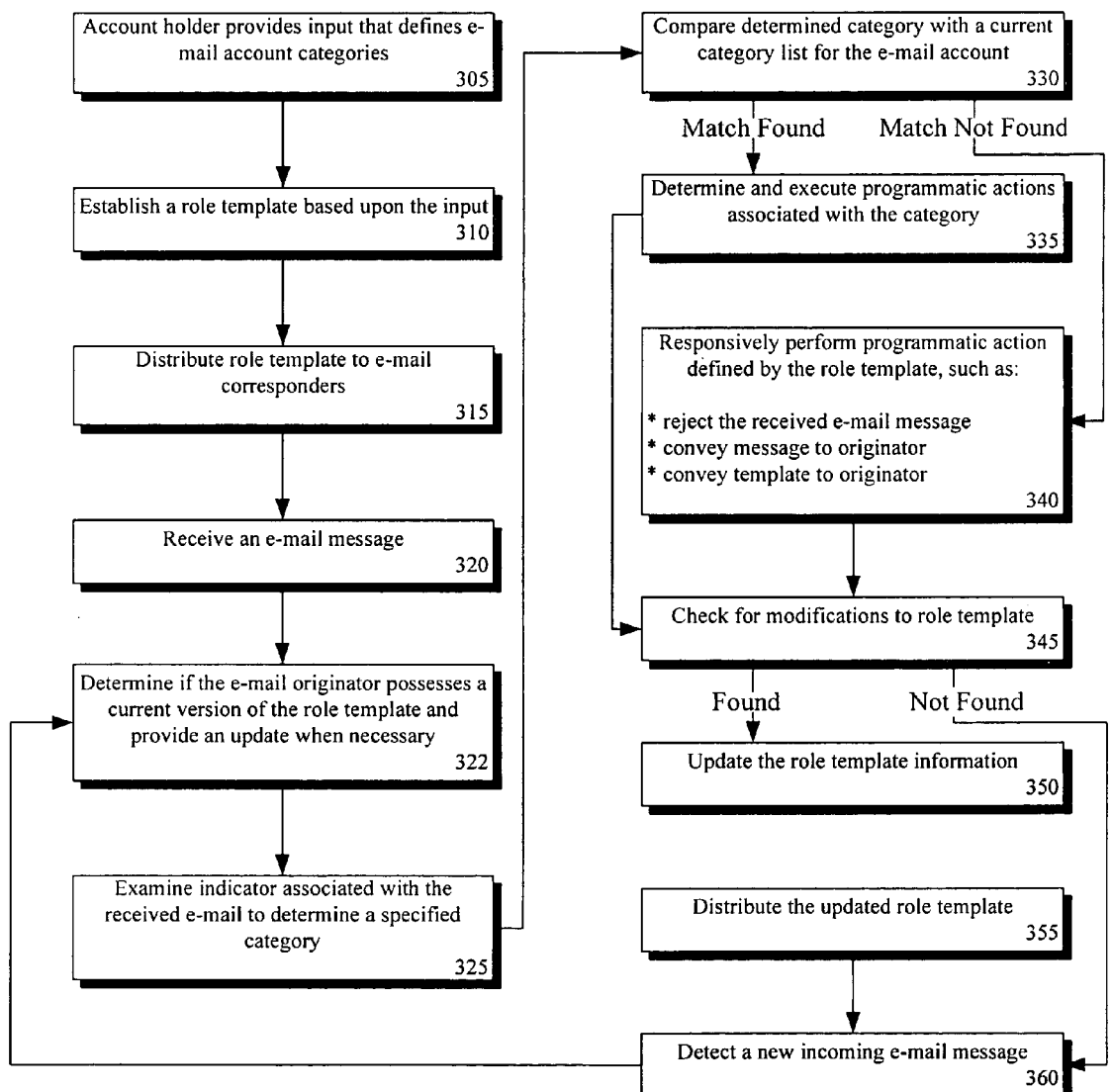
FIG. 3 is a flow chart illustrating a method for an account holder to utilize a role template in accordance with an embodiment of the illustrative arrangements disclosed herein.

FIG. 3 is a flow chart illustrating a method 300 for an account holder to utilize a role template in accordance with an embodiment of the illustrative arrangements disclosed herein. Method 300 can begin in step 305 where an account holder can provide input that defines a plurality of categories for an e-mail account. In step 310, a role template can be established in accordance with the received input. In step 315, the role template can be distributed to e-mail communicators. The distribution can include sending an electronic rendering of the role template to each recipient identified within an address book associated with the e-mail account, to recipients identified from a mailbox associated with received e-mail, to recipients identified from a mailbox associated with sent e-mail, to recipients explicitly specified by the account holder, and to any other group of definable recipients. The distribution can also include conveying an electronic rendering of the role template to a data store configured to maintain role templates. This data store can be a data store of an e-mail server that has role template capabilities or can be a data store maintained independent of any particular e-mail client or e-mail server. For example, such an independent data store can be part of a Web service that adds a role template capability to e-mail systems subscribing to the service.

Regardless of how the distribution occurs, the method can proceed from step 315 to step 320, where an e-mail message can be received. In optional step 322, the method can determine whether the e-mail message originator has a current version of the role template and, when the version is not current, can automatically convey the current version to the originator. Thus, step 322 can be one technique used to ensure e-mail communicators are provided with a current copy of the role template. Other techniques, however, such as intermittent updates can be utilized, and the invention is not to be limited in this regard.

In step 325, an indicator associated with the e-mail message can be examined to determine a category specified for the received e-mail message. In step 330, the determined category can be compared against a list of current categories associated with the role template. When a matching category is found, one or more programmatic actions associated with the category can be determined and executed, as shown by step 335.

For example, a programmatic action can cause a color-coding, icon, or other category indicator to be presented to the recipient. In another example, such as when the designated category indicates urgency, the account holder can be immediately notified of the received message. An account holder can, for example, designate within the role template that a cell phone voice message is to be delivered to a previously defined phone number whenever an e-mail message having a particular category is received.

When in step 330 the determined category is not one of the categories included within the list of current categories, the method can proceed from step 330 to step 340. In step 340 any number of programmatic actions defined by the role template can be responsively performed including, but not limited to: automatically rejecting the received e-mail message, conveying a message to the originator that a valid category must be selected, conveying a current version of the role template to the originator, and combinations thereof.

In step 345, the method can check whether the account holder provides additional input that modifies the role template. When additional input exists, the method can proceed from step 345 to step 350 where the role template can be modified in accordance with the received input. In step 355, the updated role template can be distributed to e-mail communicators. In step 360, the method can detect another incoming e-mail message from a communicator. The method can loop from step 360 to optional step 322 or to step 325, where the newly received message can be processed.

Figure 4:
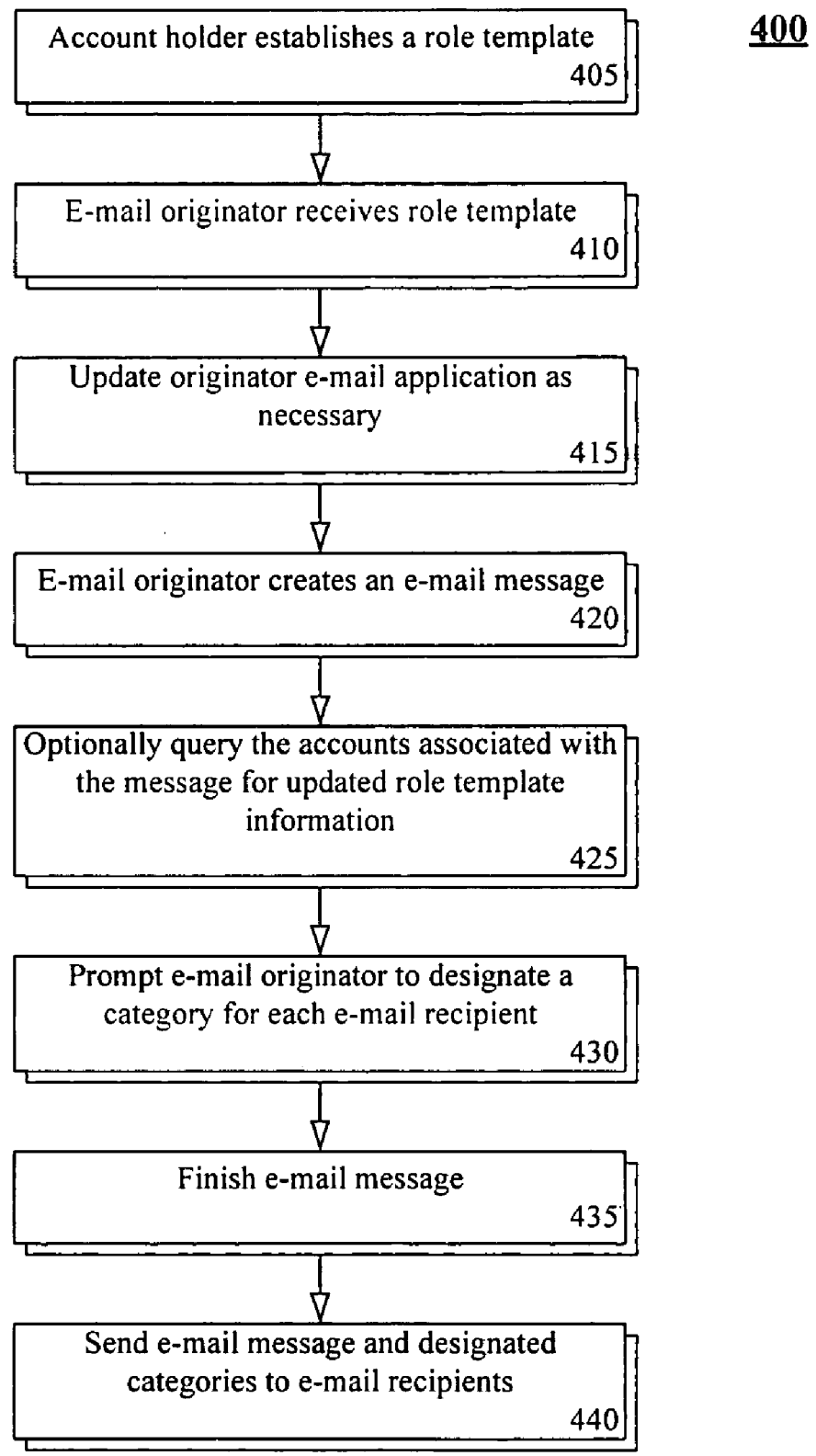
FIG. 4 is a flow chart illustrating a method where an e-mail originator sends an e-mail message to an account having an associated role template in accordance with an embodiment of the illustrative arrangements disclosed herein.

FIG. 4 is a flow chart illustrating a method 400 where an e-mail originator sends an e-mail message to an account having an associated role template in accordance with an embodiment of the illustrative arrangements disclosed herein. Method 400 can begin in step 405 where an account holder can establish a role template for an e-mail account, which defines categories for e-mail conveyed to the account.

In step 410, an e-mail originator can be provided with the role template. In step 415, an interface used by the e-mail originator can be updated as necessary to reflect the content of the role template. In step 420, the e-mail originator can originate an e-mail, which includes the account holder as a recipient. In optional step 425, the e-mail account can be queried for updates and be responsively updated to assure that the role template information possessed by the e-mail originator is current.

In step 430, the e-mail originator can be prompted to designate one of the categories before sending the e-mail to the account holder. When an e-mail message is to be conveyed to multiple recipients, multiple prompts can occur at this step, each prompt requiring the e-mail originator to designate a category defined by a role template corresponding to a target e-mail account. The prompting and designation can occur automatically based upon previously established user settings, can require explicit user interactions through a user interface, or can be performed in a completely automated fashion by software agents. In one embodiment, the e-mail originator can be provided with configurable options that determine the behavior of the originator's e-mail application.

In step 435, the e-mail message can be completed and a command for sending the message can be initiated. In step 440, the e-mail message and the designated category appropriate for a targeted e-mail recipient can be conveyed to each e-mail recipient specified within the message. In one embodiment, the designated category as well as other recipient specific information can be contained within metadata of the sent e-mail messages.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. An e-mail categorization system comprising:
   a plurality of role templates, each role template being associated with an e-mail account and defining a plurality of categories for categorizing e-mail messages, wherein an authorized account holder establishes the plurality of categories and designates programmatic actions that are to be selectively executed by an e-mail receiving application upon the receipt of e-mail messages based upon categories of the received e-mail messages, and wherein role templates are distributed to e-mail originators so that when e-mail originators direct e-mail messages to an account associated with a role template, the originators are prompted to select one of the categories defined by a corresponding role template;

an originator module associated with an e-mail application of one of the e-mail originators, the originator module having machine-readable code that directs a computing device to detect an e-mail origination event, responsive to the origination event and for each e-mail recipient that is to be conveyed an e-mail message, identify a role template associated with the e-mail recipient, and when a role template is detected, prompt the e-mail originator to designate one of the categories defined by the identified role template that pertains to the e-mail message; and a role manager module configured to mark selected categories defined by a role template as stale and to prevent new e-mail messages from being associated with a categories marked as stale, wherein the role manager module further defines actions that an account holder is to take when receiving e-mail messages associated with a stale category, and wherein one of said actions includes conveying an e-mail notification to the e-mail originator to inform the e-mail originator that a stale role has been designated against an e-mail message.

2. A computerized e-mailing method comprising the steps of:

identifying a role template for an e-mail account, wherein said role template establishes a plurality of account holder defined categories for an e-mail account;

prompting an e-mail originator to designate one of the categories based upon said role template when said e-mail originator directs an e-mail message to said e-mail account, wherein the designated category is conveyed to the e-mail account along with the e-mail message;

detecting an attempt to disseminate said role template:

validating the role template: and responsive to the validating step, selectively accepting the role template, wherein accepting the template results in a category pop-up interface item populated with categories defined by the role template to appear when the e-mail originator attempts to send an e-mail message to the e-mail account associated with the role template.

3. A computerized e-mailing method comprising the steps of:

receiving account holder provided input that defines a plurality of categories for an e-mail account;

establishing a role template in accordance with the received input;

distributing the role template to a plurality of e-mail communicators; and using indicators from the e-mail communicators that designate one of the categories defined by said role template to handle e-mail messages received from the e-mail communicators;

wherein said using step comprises the steps of: receiving an e-mail message; examining an indicator associated with the e-mail message to determine a category specified for the received e-mail message; comparing the determined category against a list of current categories associated with the role template; and performing at least one previously defined programmatic action based upon results of said comparing step;

wherein the comparing step determines that the determined category is not one of the categories included within the list of current categories by automatically conveying an e-mail message to an originator of the e-mail message that indicates that a valid category for the e-mail message is to be selected in order for the e-mail to be conveyed to the intended recipient.

* * * * *